US011941076B1

(12) United States Patent
Chigurupalli et al.

(10) Patent No.: US 11,941,076 B1
(45) Date of Patent: Mar. 26, 2024

(54) INTELLIGENT PRODUCT SEQUENCING FOR CATEGORY TREES

(71) Applicant: Dell Products L.P., Round Rock, TX (US)

(72) Inventors: Ravi Chandra Chigurupalli, Leander, TX (US); Irfan Gilani, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/935,307

(22) Filed: Sep. 26, 2022

(51) Int. Cl.
G06Q 30/0201 (2023.01)
G06F 16/958 (2019.01)
G06N 20/00 (2019.01)
G06Q 30/0202 (2023.01)

(52) U.S. Cl.
CPC ....... G06F 16/958 (2019.01); G06Q 30/0201 (2013.01); G06Q 30/0202 (2013.01)

(58) Field of Classification Search
CPC .............. G06F 16/958; G06Q 30/0201; G06Q 30/0202; G06N 20/00
USPC ........................................................ 715/234
See application file for complete search history.

(56) References Cited

U.S. PATENT DOCUMENTS

| | | | | |
|---|---|---|---|---|
| 9,418,147 B2* | 8/2016 | Miao | ..................... | G06F 16/353 |
| 9,524,310 B2* | 12/2016 | Gu | ..................... | G06Q 30/0625 |
| 11,481,722 B2* | 10/2022 | Chandrasekhar | ..... | G06F 16/258 |
| 2014/0122469 A1* | 5/2014 | Chang | ..................... | G06Q 30/02 707/725 |
| 2014/0172652 A1* | 6/2014 | Pobbathi | ............. | G06Q 10/087 705/28 |
| 2014/0180881 A1* | 6/2014 | Krueger | ................ | G06Q 10/06 705/28 |
| 2016/0078384 A1* | 3/2016 | Krueger | ................ | G06F 30/00 705/7.25 |
| 2020/0151663 A1* | 5/2020 | Balakrishnan | ........ | G06F 16/258 |
| 2020/0286103 A1* | 9/2020 | Sullivan | ............. | G06Q 30/0201 |
| 2021/0120297 A1* | 4/2021 | Deshpande | ......... | G06F 16/9535 |
| 2021/0142105 A1* | 5/2021 | Siskind | ..................... | G06T 7/20 |
| 2022/0044298 A1* | 2/2022 | Oshinaike | .............. | G06V 20/52 |

(Continued)

OTHER PUBLICATIONS

Hasson et al., Category Recognition in E-Commerce Using Sequence-to-Sequence Hierarchical Classification, published Mar. 2021 via ACM, pp. 1-4 (pdf).*

(Continued)

Primary Examiner — Manglesh M Patel
(74) Attorney, Agent, or Firm — DALY, CROWLEY, MOFFORD & DURKEE, LLP

(57) ABSTRACT

In one aspect, an example methodology includes, by a computing device, receiving information about a product from another computing device and determining one or more relevant features from the information about the product, the one or more relevant features influencing prediction of a sequence number. The method also includes, by the computing device, generating, using a machine learning (ML) model, a prediction of a sequence number for the product based on the determined one or more relevant features, the sequence number being indicative of a sequence within a product category tree. The method may also include, by the computing device, sending the prediction to the another computing device.

20 Claims, 7 Drawing Sheets

(56) References Cited

U.S. PATENT DOCUMENTS

| | | | | |
|---|---|---|---|---|
| 2023/0139720 A1* | 5/2023 | Sortur | ................... | G06V 10/56 |
| | | | | 705/26.64 |
| 2023/0162253 A1* | 5/2023 | Raghavan | .............. | G06N 20/20 |
| | | | | 705/26.62 |
| 2024/0005269 A1* | 1/2024 | Knight | ............... | G06Q 30/0633 |

OTHER PUBLICATIONS

Zhu et al., Learning Tree-based Deep Model for Recommender Systems, published Dec. 2018 via arXiv, pp. 1-10 (pdf).*

Fries Trutz, Amazon Categories and Product Type—How It's All Related, published Jul. 15, 2022 via amalytix.com, pp. 1-20 (pdf).*

Shankar et al., Applying Machine Learning to Product Categorization, published 2011 by Standford University, pp. 1-5 (pdf).*

Ferreira et al., A Unified Model with Structured Output for Fashion Images Classification, published 2018 by ACM, pp. 1-10 (pdf).*

Cevahir et al., Large-Scale Multi-class and Hierarchical Product Categorization for an E-commerce Giant, published 2016 by 26th International Conference on Computational Linguistics, pp. 525-535.*

Zornitsa Kozareva, Everyone Likes Shopping! Multi-class Product Categorization for e-Commerce, published 2015 by Association for Computational Linguistics, pp. 1329-1333.*

Maggie Li et al., Unconstrained Product Categorization with Sequence-to-Sequence Models, Jul. 2018 eCom Data Challenge, pp. 1-6 (pdf).*

* cited by examiner

INTELLIGENT PRODUCT SEQUENCING FOR CATEGORY TREES

BACKGROUND

Product category trees are commonly used by organizations, such as companies, enterprises, or other entities that sell products (e.g., electronic devices) and/or services, to organize their products into easy to navigate product verticals for their customers or potential customers. A product category tree is a sequential grouping of products into categories. A product category tree may include multiple entries or nodes organized in a hierarchical tree structure. For example, a product category tree may include a first hierarchical level commonly referred to as a root level (or "root") of the product category tree. Below the root level may be a second hierarchical level comprised of one or more sub-categories. Below a sub-category in the second hierarchical level may be one or more sub-sub-categories in a third hierarchical level, and so on. Below a sub-category in the final or bottom hierarchical level, or any hierarchical level in the tree other than the root level, may be one or more leaf nodes which correspond to the products. A user, such as a customer, may navigate through the hierarchical structure of the product category tree to find a particular product of interest.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

It is appreciated herein that product category trees can be extremely important in enabling browsing-style information access. For example, a product category tree helps a user browse an organization's e-commerce platform's (e.g., a website's) content using the category approach, which makes it easier for the user to find the content of interest. Within a product category tree, the products are arranged in a hierarchy of categories. Any number of categories and subcategories can be nested to provide users with better choices for browsing and identifying content (e.g., products). Today, human data maintainers are tasked with understanding the vast amounts of sales and marketing data in order to build a product category tree. For large-scaled e-commerce platforms which include very large numbers products and, in some cases hundreds of thousands of products, leveraging humans to sequence the large numbers of products and categories is very time-consuming and costly. Another drawback to generating product category trees in this manner is that it is subject to human interpretation (e.g., subjective) and, therefore, inconsistent. A further drawback is that the generated classification sequence is directly related to the human's expertise. The disclosed embodiments address the drawbacks exhibited by human generation of product category trees.

In accordance with one illustrative embodiment provided to illustrate the broader concepts, systems, and techniques described herein, a method includes, by a computing device, receiving information about a product from another computing device and determining one or more relevant features from the information about the product, the one or more relevant features influencing prediction of a sequence number. The method also includes, by the computing device, generating, using a machine learning (ML) model, a prediction of a sequence number for the product based on the determined one or more relevant features, the sequence number being indicative of a sequence within a product category tree. The method may also include, by the computing device, sending the prediction to the another computing device.

In one aspect, the product is a new product. In another aspect, the product is an existing product.

In some embodiments, the ML model includes an artificial neural network (ANN).

In some embodiments, the ML model is built using a modeling dataset generated from a corpus of product information about products offered for sale by an organization during a preceding period.

In some embodiments, the product information includes product attributes information.

In some embodiments, the product information includes product selling context information.

In some embodiments, the product information includes product variants context information.

In some embodiments, the product information includes product order information-based geolocation information.

In some embodiments, the product information includes product payment transactions information.

In some embodiments, the product information includes product review information.

In some embodiments, the product information includes product ratings information.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
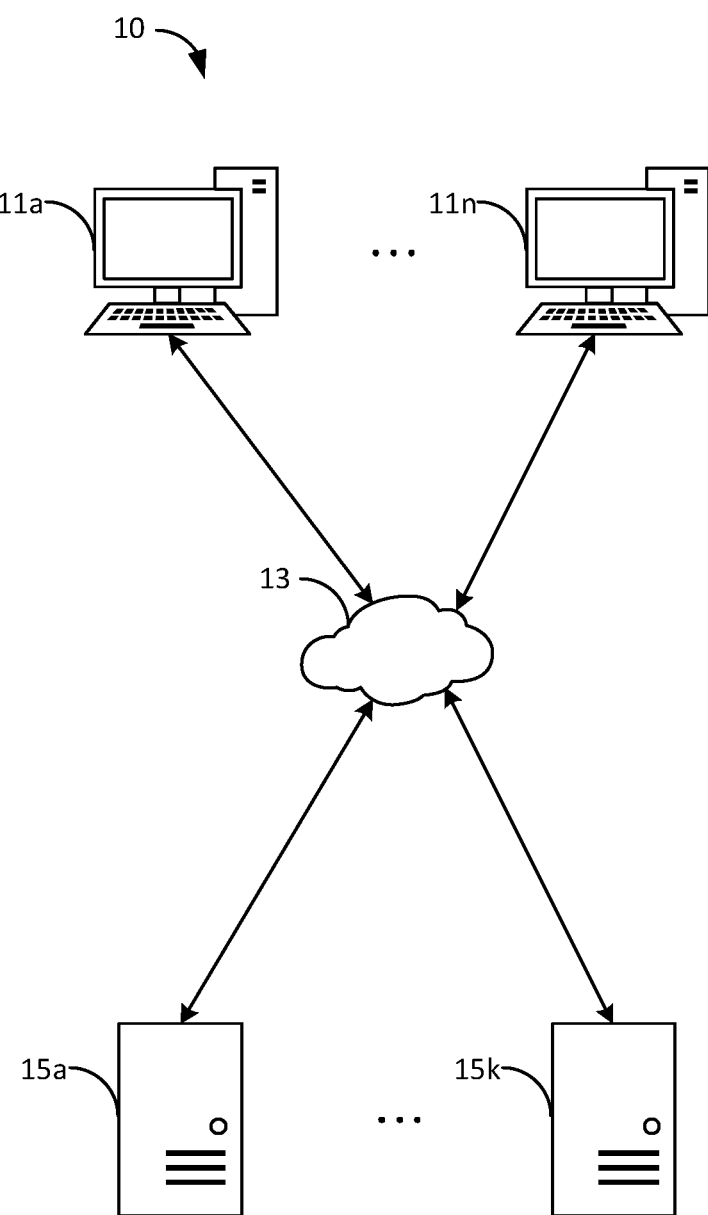
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
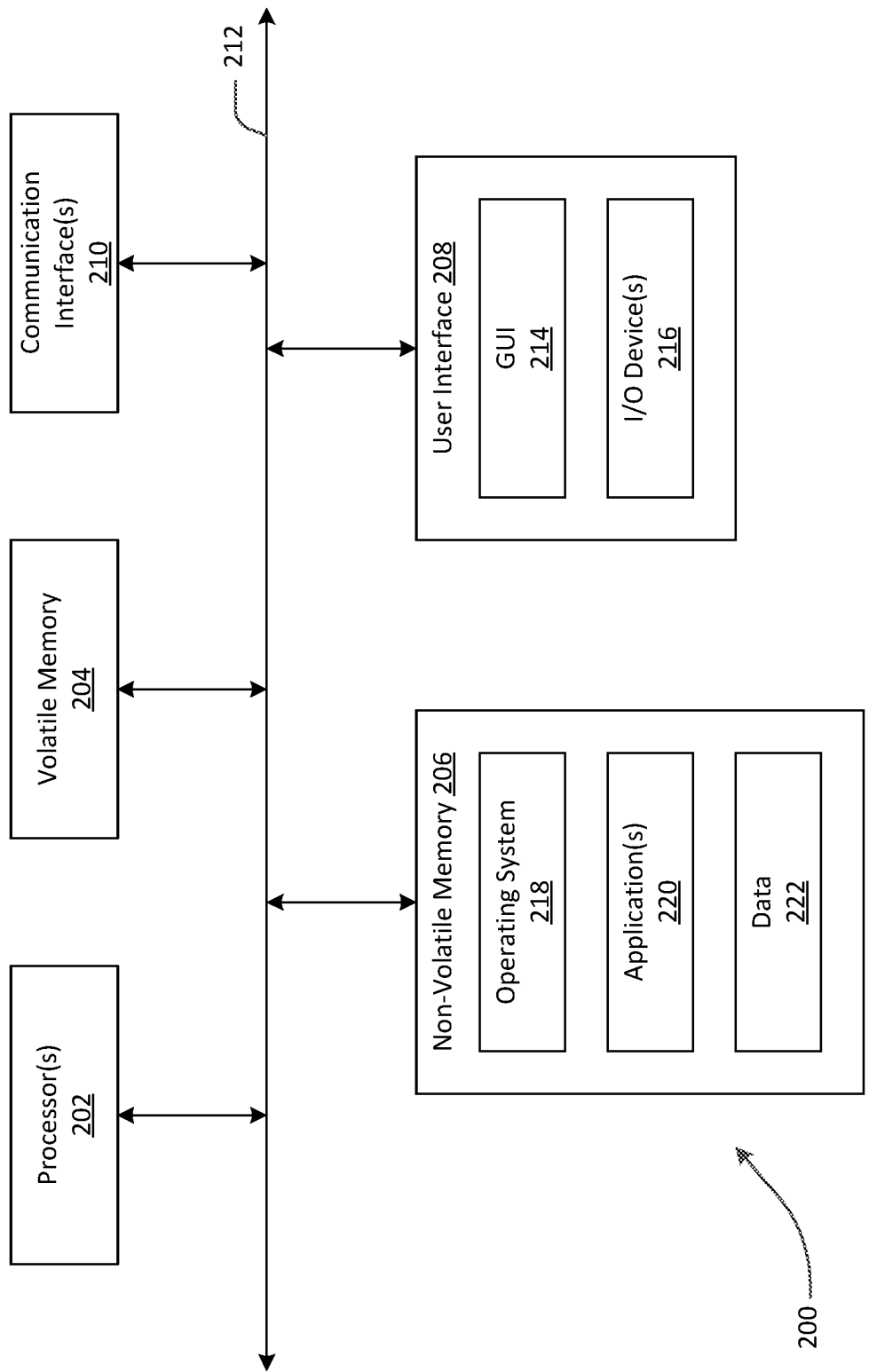
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 7). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
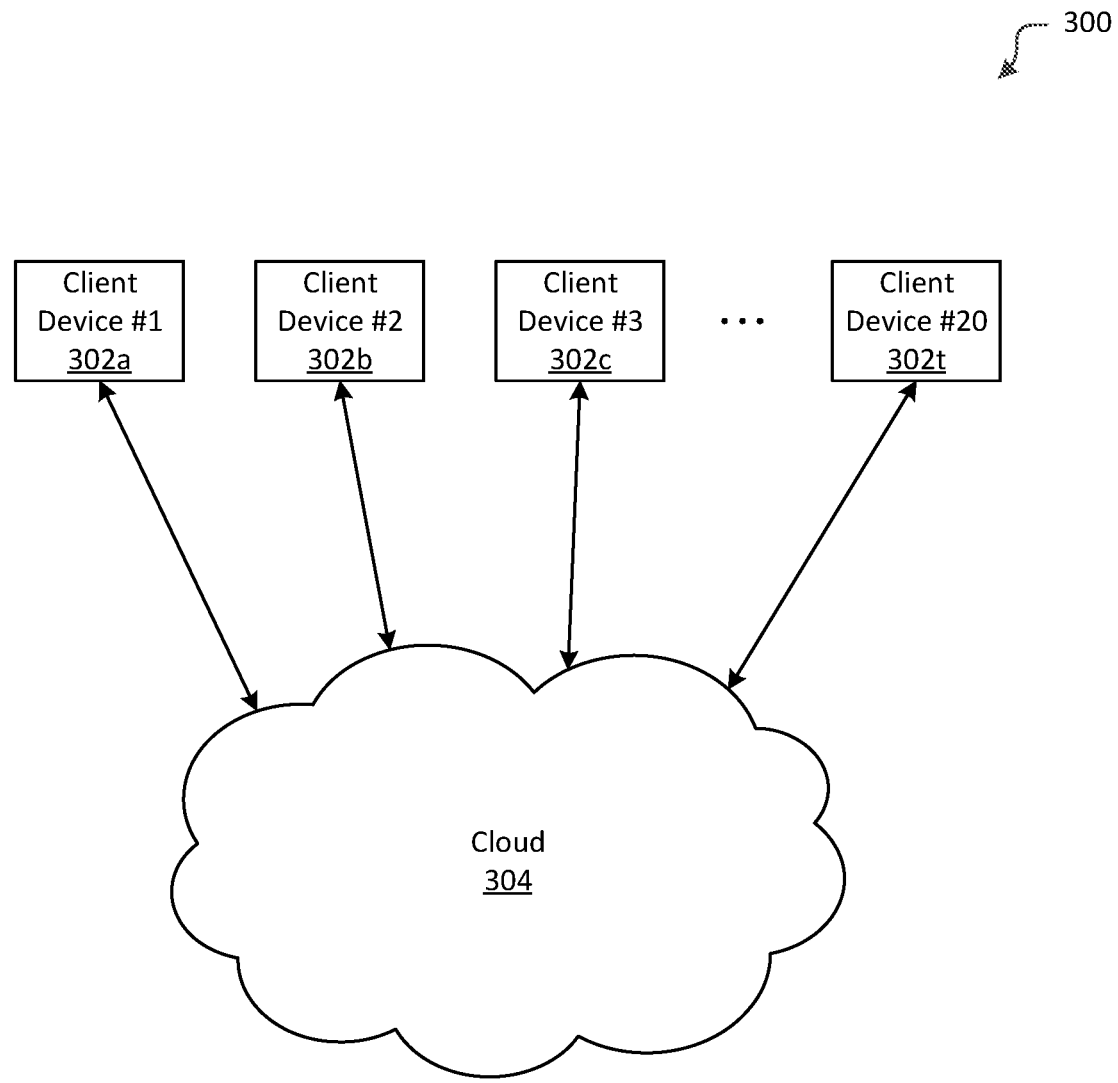
FIG. 3 is a diagram of a cloud computing environment in which various aspects of the concepts described herein may be implemented.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (SaaS), Platform as a Service (PaaS), Infrastructure as a Service (IaaS), and/or Desktop as a Service (DaaS), for example. IaaS may refer to a user renting the use of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
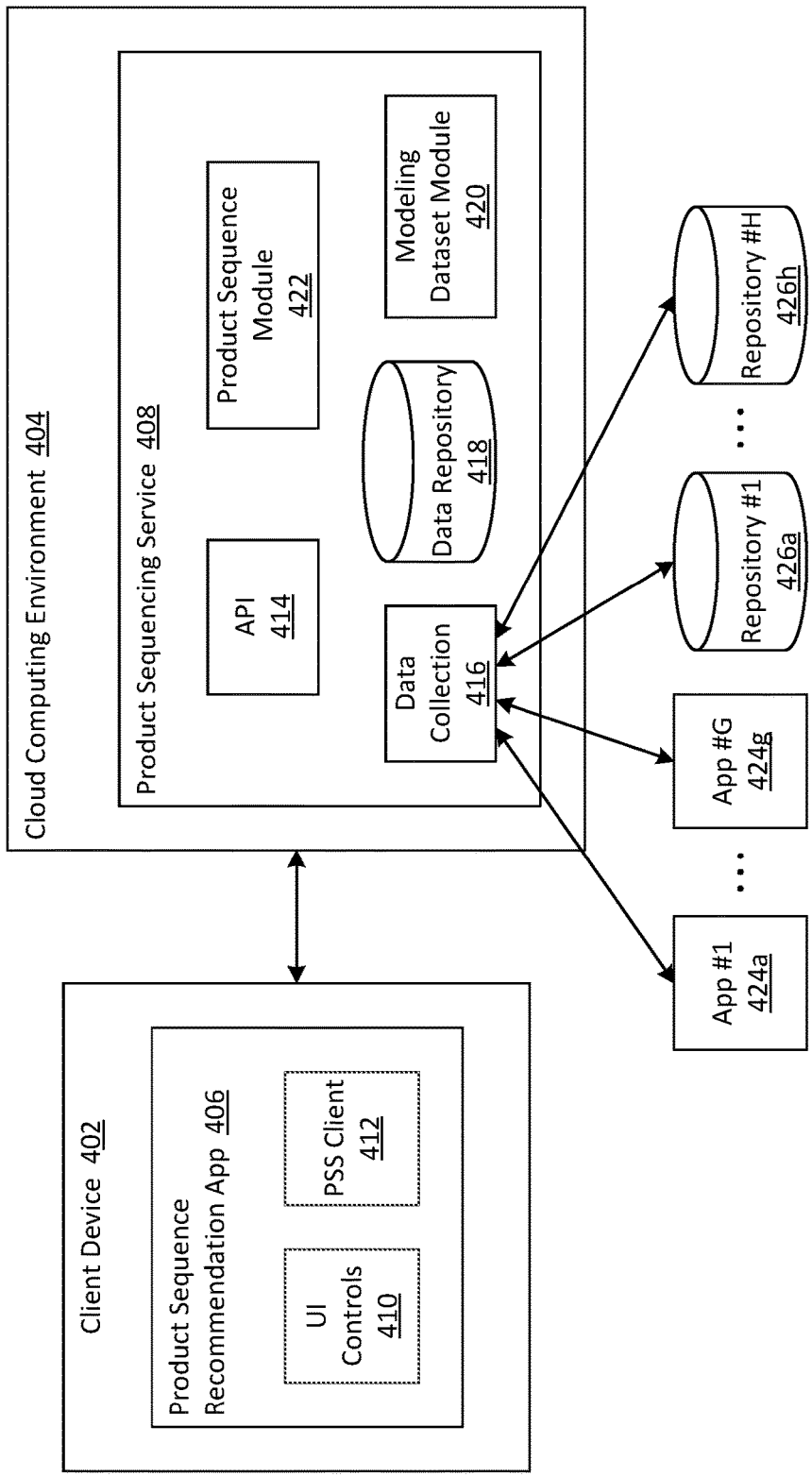
FIG. 4 is a block diagram of a system for intelligent product sequencing, in accordance with an embodiment of the present disclosure.

FIG. 4 is a block diagram of a system 400 for intelligent product sequencing, in accordance with an embodiment of the present disclosure. Illustrative system 400 includes a product sequence recommendation application 406 installed on a client device 402 and configured to communicate with a cloud computing environment 406 via one or more computer networks. Client device 402 and cloud computing environment 406 of FIG. 4 can be the same as or similar to client 11 of FIG. 1 and cloud computing environment 300 of FIG. 3, respectively.

As shown in FIG. 4, a product sequencing service 408 can be provided as a service (e.g., a microservice) within cloud computing environment 406. Product sequence recommendation application 406 and product sequencing service 408 can interoperate to offer intelligent sequencing of products and categories within a product category tree (also known as a product taxonomy), as variously disclosed herein. To promote clarity in the drawings, FIG. 4 shows a single product sequence recommendation application 406 communicably coupled to product sequencing service 408. However, embodiments of product sequencing service 408 can be used to service many client applications (e.g., product sequence recommendation applications 404) installed on clients (e.g., client devices 402) associated with one or more organizations and/or users. Product sequence recommendation application 406 and/or product sequencing service 408 may be implemented as computer instructions executable to perform the corresponding functions disclosed herein. Product sequence recommendation application 406 and product sequencing service 408 can be logically and/or physically organized into one or more components. In the example of FIG. 4, product sequence recommendation application 406 includes UI controls 410 and a product sequencing service (PSS) client 412. Also, in this example, product sequencing service 408 includes an application programming interface (API) module 414, a data collection module 416, a data repository 418, a modeling dataset module 420, and a product sequence module 422.

The client-side product sequence recommendation application 406 can communicate with the cloud-side product sequencing service 408 using an API. For example, product sequence recommendation application 406 can utilize PSS client 412 to send requests (or "messages") to product sequencing service 408 wherein the requests are received and processed by API module 414 or one or more other components of product sequencing service 408. Likewise, product sequencing service 408 can utilize API module 414 to send responses/messages to product sequence recommendation application 406 wherein the responses/messages are received and processed by PSS client 412 or one or more other components of product sequence recommendation application 406.

Product sequence recommendation application 406 can include various UI controls 410 that enable a user, such as a data maintainer or other product team member within or associated with an organization, to access and interact with product sequencing service 408. For example, UI controls 410 can include UI elements/controls, such as input fields and text fields, that a user can use to enter (e.g., specify) information about a product, such as, for example, attributes of the product, product selling context information, product variants information, payment transactions information, order information-based geolocation data, and product reviews and rating data, among others. In some implementations, some or all the UI elements/controls can be included in or otherwise provided via one or more electronic forms configured to provide a series of fields where data is collected, for example. Generally, UI controls 410 can include controls/elements that a user can use to input information about a product (e.g., a new product or an existing product) that is being offered for sale by the organization and which needs to be sequenced. UI controls 410 can also include controls that the user can click/tap to request a sequencing of the product corresponding to the entered information. In response to the user input, product sequence recommendation application 406 can send a message to product sequencing service 408 requesting the sequencing of the product.

Product sequence recommendation application 406 can also include UI controls 410 that enable a user to view a predicted sequence for a product. For example, in some embodiments, responsive to sending a request to sequence a product, product sequence recommendation application 406 may receive a response from product sequencing service 408 which includes a predicted (e.g., recommended) sequence, such as a sequence number, for the product. UI controls 410 can include a button or other type of control/element for displaying a sequence number predicted for the product.

As another example, UI controls 410 can include buttons or other types of controls/elements for providing feedback about the predicted sequence for the product such as, for instance, acceptance of the predicted sequence, rejection of the predicted sequence, and change to the predicted sequence. For example, a first button may be for accepting the predicted sequencing, a second button may be for rejecting the predicted sequencing, and a third button may be for changing the predicted sequencing. In response to the user clicking/tapping on a button corresponding to a particular feedback, product sequence recommendation application 406 can send a message to product sequencing service 408 informing of the user's feedback.

As another example, UI controls 410 can include buttons or other types of controls/elements for generating a visual representation of a product category tree representing the sequencing of the products which are being offered for sale by the organization. In the case where a new product is sequenced, the visual representation of the product category tree represents the sequencing of the products, including the newly sequenced new product. In the case where an existing product is sequenced (e.g., an existing product is re-sequenced), the visual representation of the product category tree represents the sequencing of the products, including the re-sequenced existing product. In any case, UI controls 410 can also include controls/elements for making changes to the visual representation of the product category tree. In response to the user changing the sequencing of one or more products and/or sub-categories/sub-sub-categories/etc. using the provided controls/elements, product sequence recommendation application 406 can send a message to product sequencing service 408 causing product sequencing service 408 to store the changes to the product category tree representing the sequencing of the products or store a new product category tree representing the changed sequencing of the products. Thus, UI controls 410 may enable a user to make changes to a product category tree and upload the user's changes to the product category tree to product sequencing service 408 such that the uploaded changes are included (or "reflected") in subsequent product category trees generated by product sequencing service 408.

As another example, UI controls 410 can include buttons or other types of controls/elements for generating a modeling dataset for building a machine learning (ML) model to predict a sequence (e.g., sequence number) for an input product. In response to the user's input, product sequence recommendation application 406 can send a message to product sequencing service 408 causing product sequencing service 408 to generate a modeling dataset.

As another example, UI controls 410 can include buttons or other types of controls/elements for generating an ML model for predicting a sequence for an input product. In some implementations, UI controls 410 can also include controls/elements for specifying the model hyperparameters (e.g., model architecture, learning rate, number of epochs, etc.) and a modeling dataset. In response to the user's input, product sequence recommendation application 406 can send a message to product sequencing service 408 causing product sequencing service 408 to build an ML model based on the user inputs.

In the embodiment of FIG. 4, product sequence recommendation application 406 is shown as a stand-alone client application. In other embodiments, product sequence recommendation application 406 may be implemented as a plug-in or extension to another application (e.g., a web browser) on client device 402, such as, for example, an enterprise client application. In such embodiments, UI controls 410 may be accessed within the other application in which product sequence recommendation application 406 is implemented (e.g., accessed within the enterprise client application).

Referring to the cloud-side product sequencing service 408, data collection module 416 is operable to collect or otherwise retrieve information and data about the organization's products from one or more data sources. Such information and data about a product are referred to herein as "product information." In some embodiments, for a particular product, the product information can include information/data about the attributes (also referred to herein as "product attributes information"), the selling context (also referred to herein as "product selling context information"), the variants (also referred to herein as "product variants information"), order information-based geolocation (also referred to herein as "product order information-based geolocation information"), payment transaction(s) (also referred to herein as "product payment transactions information"), reviews (also referred to herein as "product review information"), ratings (also referred to herein as "product ratings information"), and user generated information/data, among others. The product information can also include the sequencing information (e.g., sequence numbers) of the products.

The product attribute information may include information/data indicative of the properties that describe a product. The product attribute information may include details that are tangible, intangible, subjective, and objective. The product attribute information enables users (e.g., customers and potential customers) to find, compare, and choose products. For example, for a particular product, such as a particular electronic product, the product attribute information may include information/data which describe the properties of the product such as a size, a weight, a processor, an operating system, a graphics card/processor, amount of memory, types of memory, hard drives, display, and other components of the product. The list of properties illustrated above are merely examples of the properties of a product. It should be understood that the properties (e.g., properties described by the product attribute information) can vary for different products and/or different types of products. For example, a server product may have different properties than another different server product. As another example, hardware products may typically have different properties than software products.

The product selling context information may include information/data indicative of how a product was sold. The product selling content information may describe the set of circumstances or facts that surround the sale of the product. For example, for a particular product, the product selling context information may include information/data about the type of transaction (e.g., business-to-business, business-to-consumer, type of business, size of the business, etc.), how the product was sold (e.g., sold separately, sold as part of a product bundle, sold at list price, sold at promotional price, direct sale, online sale, sold via a partner, etc.), the number of times the product was sold, and the number of times the product was searched, among others.

The product variants information may include information/data indicative of the different variations of a product that are being offered for sale. For example, for a particular product, the product variants information may include information/data about different versions of the product, different models of the product, and different configurations of the product, among others. Each product variant may have an identifier that uniquely identifies the variation of the product.

The product order information-based geolocation information may include information/data indicative of the geographic location associated with the sale of a product. For example, for a particular product, the product order information-based geolocation information may include information/data about the location of the customer (e.g., address, state, country, region, etc.), location at which the customer received the product, and business region in which the product was sold (e.g., Asia Pacific (APAC), Europe, Middle East and Africa (EMEA) Latin America Division (LAD), North America (NA), etc.).

The product review information may include information/data indicative of an average sentiment conveyed in the reviews of a product. The reviews may be written by a customer, a potential customer, or a product reviewer such as, for example, an expert. For example, for a particular product, Natural Language Processing (NLP) techniques can be applied to the individual product reviews to determine the moods or emotions expressed in the product review. A sentiment score, which is indicative of an average sentiment (e.g., positive, neutral, negative, etc.), can be assigned to the collection of product reviews (e.g., the collection of reviews of the product) based on the determined moods or emotions expressed in the individual product reviews.

The product ratings information may include information/data indicative of an average of the 1 to 5-star ratings given to a product. This information can also include the total number of reviews for the product. As an example of determining an average of the 1 to 5-star ratings, suppose that a product received the following 1 to 5-star ratings: 5 stars, 5 stars, 5 stars, 5 stars, 5 stars, 5 stars, 4 stars, 4 stars, 3 stars, and 3 stars. In this example, the average of the 1 to 5-star ratings for the product is 4.4 stars. The product payment transactions information may include information/data indicative of the type of payment (e.g., credit, debit, finance, etc.) associated with the purchase of a product.

As mentioned previously, data collection module 416 can collect information and data about the organization's products from one or more data sources. The data sources can include, for example, one or more applications 424a-424g (individually referred to herein as application 424 or collectively referred to herein as applications 424) and one or more repositories 426a-426h (individually referred to herein as repository 426 or collectively referred to herein as repositories 426). Applications 424 can include various types of applications such as software as a service (SaaS) applications, web applications, and desktop applications, to provide a few examples. In some embodiments, applications 424 may correspond to the organization's enterprise applications and/or systems such as, for example, product information management (PIM) applications/systems, catalogue management applications/systems, payment applications/systems, order management applications/systems, and other enterprise resource planning (ERP), supply chain management (SCM) applications, and/or sales management (SM) applications. Repositories 426 can include various types of data repositories such as conventional file systems, cloud-based storage services such as SHAREFILE, BITBUCKET, DROPBOX, and MICROSOFT ONEDRIVE, and web servers that host files, documents, and other materials. In some embodiments, repositories 426 may correspond to the organization's repositories used for storing at least some of the historical product data.

Data collection module 416 can utilize application programming interfaces (APIs) provided by the various data sources to collect information and materials therefrom. For example, data collection module 416 can use a REST-based API or other suitable API provided by a PIM application/system to collect information therefrom (e.g., to collect product attributes information). In the case of web-based applications, data collection module 416 can use a Web API provided by a web application to collect information therefrom. As another example, data collection module 416 can use a REST-based API or other suitable API provided by a catalog management application/system to collect information therefrom (e.g., to collect product selling context information and product variants information). As still another example, data collection module 416 can use a REST-based API or other suitable API provided by an order management application/system to collect information therefrom (e.g., to collect product order information-based geolocation information). As yet another example, data collection module 416 can use a REST-based API or other suitable API provided by a payment application/system to collect information therefrom (e.g., to collect product payment transactions information). As another example, data collection module 416 can use a file system interface to retrieve the files containing user generated content associated with the products, such as product review information, product ratings information, etc., from a file system. As yet another example, data collection module 416 can use an API to collect documents containing data and information about or concerning the products from a cloud-based storage service. A particular data source (e.g., a PIM application/system, catalog management application/system, order management application/system, payment application/system, and/or data repository) can be hosted within a cloud computing environment (e.g., cloud computing environment 404 of product sequencing service 408 or a different cloud computing environment) or within an on-premises data center (e.g., an on-premises data center of an organization that utilizes product sequencing service 408).

In cases where an application or data repository does not provide an interface or API, other means, such as printing and/or imaging, may be utilized to collect information therefrom (e.g., generate an image of printed document containing information/data about a historical product). Optical character recognition (OCR) technology can then be used to convert the image of the content to textual data.

In some embodiments, data collection module 416 can collect the product information from one or more of the various data sources on a continuous or periodic basis (e.g., according to a predetermined schedule specified by the organization). In some embodiments, data collection module 416 can store the product information collected from the various data sources within data repository 418, where it can subsequently be retrieved and used. For example, the historical product information can be retrieved from data repository 418 and used to generate a modeling dataset for use in building an ML model. In some embodiments, data repository 418 may correspond to a storage service within the computing environment of product sequencing service 408.

Modeling dataset module 420 is operable to generate (or "create") a modeling dataset for use in building (e.g., training, testing, etc.) an ML model to predict a sequence for an input product. To generate a modeling dataset, modeling dataset module 420 can retrieve from data repository 418 a corpus of product information. For example, in one embodiment, modeling dataset module 420 can retrieve product information about products offered for sale by the organization during a preceding period (e.g., six months). In other words, modeling dataset module 420 can retrieve product information about products which were available for purchase from the organization during the preceding period. The preceding period may be configurable by the organization. Modeling dataset module 420 can then use the use the retrieved corpus of product information about the products offered for sale by the organization to generate the modeling dataset. For example, in one embodiment, as will be further described below with respect to FIG. 5, the modeling dataset may be generated as part of a model building process.

In some embodiments, modeling dataset module 420 can generate the modeling dataset in response to an input. For example, a user of product sequence recommendation application 406 may click/tap on a displayed UI control/element and, in response, product sequence recommendation application 406 may send a message to product sequencing service 408 that causes modeling dataset module 420 to generate the modeling dataset. As another example, a user of product sequence recommendation application 406 may click/tap on a displayed UI control/element and, in response, product sequence recommendation application 406 may send a message to product sequencing service 408 that causes product sequencing service 408 to build an ML model. As part of building the ML model, product sequencing service 408 or a component of product sequencing service 408 can cause modeling dataset module 420 to generate the modeling dataset. In other embodiments, modeling dataset module 420 can generate a modeling dataset on a periodic basis (e.g., according to a predetermined schedule specified by the organization).

Still referring to product sequencing service 408, product sequence module 422 is operable to predict a sequence (e.g., a sequence number) of an item. The predicted sequence number may be a sequence number within a product category tree. In some embodiments, product sequence module 422 can include a learning algorithm (e.g., an ANN) that is trained and tested using machine learning techniques with a modeling dataset generated from a corpus of product information about the organization's products. As previously described, the corpus of product information may be about products offered for sale by the organization during a preceding period such as, for example, six months. Once the learning algorithm is trained, the trained ML model can, in response to input of information about a product (e.g., a new product or an existing product) that is being offered by the organization (e.g., input of a feature vector that represents relevant features of the product which needs to be sequenced), predict a sequence number for the input product based on the learned behaviors (or "trends") in the modeling dataset. The predicted sequence number, for example, may be indicative of a sequence within a product category tree representing the sequencing of products being offered for sale by the organization. Further description of the training of the learning algorithm (e.g., an ANN) implemented by product sequence module 422 is provided below at least with respect to FIG. 5.

In some embodiments, product sequence module 422 can build a product category tree which includes a sequencing of a product based on a sequence number predicted for the product. For example, in one implementation, product sequence module 422 can build a product category tree which includes a sequencing of a new product by updating an existing category tree to include the sequencing of the new product. In the case where an existing product is re-sequenced, product sequence module 422 can build a product category tree by updating an existing category tree to include the re-sequencing of the existing product. The existing category tree may be retrieved from a data repository (e.g., data repository 418). The retrieved existing category tree may represent the sequencing of the products used to regenerate a modeling dataset which was used to build the ML model which predicted the sequence for the product.

As an example of building a product category tree which includes a sequencing of a product based on a sequence number predicted for the product, suppose that the existing category tree represents the sequencing of products A, B, C, D, E, F, G, H, I, and J, which have the following sequence numbers: product A having sequence number 1, product B having sequence number 2, product C having sequence number 3, product D having sequence number 4, product E having sequence number 5, product F having sequence number 6, product G having sequence number 7, product H having sequence number 8, product I having sequence number 9, and product J having sequence number 10. In this example, suppose that a lower sequence number indicates a higher rank or sequencing within the product category tree. Also suppose that products A, B, C, D, E, F, G, H, I, and J, with their corresponding sequence numbers as the dependent variables (e.g., informative labels) in the modeling dataset, were used to build the ML model configured to predict a sequence number. In this instance, note that a predicted sequence number output by the ML model will be either 1, 2, 3, 4, 5, 6, 7, 8, 9, or 10 since the ML model was built from a modeling dataset generated using products A, B, C, D, E, F, G, H, I, and J. Also suppose that the ML model predicted a sequence number 3 for the product. In this example, to build the product category, in one implementation, product sequence module 422 can sequence the product within the existing product category tree to immediately precede product B which also has sequence number 3 (e.g., sequence the product between product B and product C in the existing product category tree). In another implementation, product sequence module 422 can sequence the product within the existing product category tree to immediately follow product B which also has sequence number 3 (e.g., sequence the product between product C and product D in the existing product category tree). In any case, once the product is sequenced within the existing product category, the sequencing of the products having a lower rank (lower sequencing) is updated to account for the sequencing of the product. For example, in the first implementation above, once the product is sequenced within the existing product category tree, the sequence numbers of products C, D, E, F, G, H, I, and J are updated (e.g., incremented) to reflect the inclusion of the product in the existing product category tree. Note that the sequencing or re-sequencing of the product within the existing category tree may also cause a change in the sequencing of one or more subcategories/sub-sub-categories/etc. in the existing product category tree.

In some embodiments, product sequence module 422 can re-sequence one or more existing products on a periodic basis (e.g., it can be configured as an organizational policy or a user preference). For example, the organization can define a product re-sequencing policy which specifies the existing product(s) and/or types of existing product(s) which are to be re-sequenced and a schedule for re-sequencing the specified existing product(s) and/or types of existing product(s). Product sequence module 422 can then periodically re-sequence one or more existing products as defined by (e.g., based on) the product re-sequencing policy.

Figure 5:
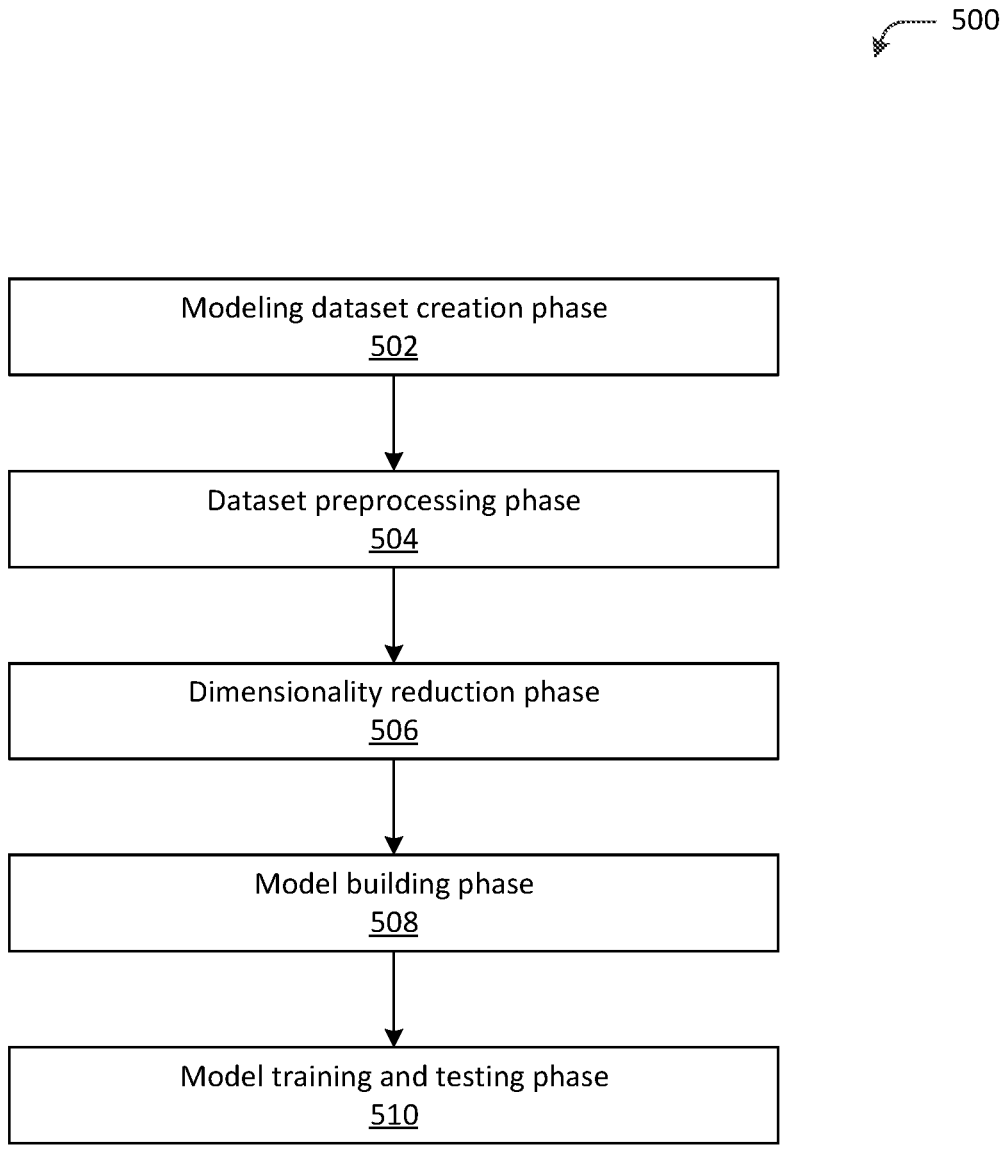
FIG. 5 shows an illustrative workflow for a model building process, in accordance with an embodiment of the present disclosure.

Referring now to FIG. 5, and with continued reference to FIG. 4, shown is an illustrative workflow 500 for a model building process, in accordance with an embodiment of the present disclosure. In particular, workflow 500 shows an illustrative process for building an ML model (e.g., an ANN) for product sequence module 422. Some or all operations of illustrative workflow 500 may be performed, for example, by components of a product sequencing service (e.g., modeling dataset module 420 and product sequence module 422 of product sequencing service 408). As shown, workflow 500 includes a modeling dataset creation phase 502, a dataset preprocessing phase 504, a dimensionality reduction phase 506, a model building phase 508, and a model training and testing phase 510.

In more detail, modeling dataset creation phase 502 can include collecting a corpus of product information from which to generate a modeling dataset. The corpus of product information may be about products offered for sale by the organization during a preceding period such as a preceding 6 months. The corpus of product information can include product attributes information, product selling context information, product variants information, product order information-based geolocation information, product payment transactions information, product review information, product ratings information, other user generated information about the organization's products. The product information can also include sequencing information (e.g., sequence numbers) of the organization's products. The corpus of product information provides a rich historical dataset that can be used to fit the ML model. For example, in one embodiment, modeling dataset module 420 can retrieve from data repository 418 the corpus of product information.

Dataset preprocessing phase 504 can include preprocessing the collected corpus of product data to be in a form that is suitable for training the ML model (e.g., an ANN). For example, in one embodiment, natural language processing (NLP) algorithms and techniques may be utilized to preprocess the text data included in the corpus of product information. The data preprocessing may include, for example, tokenization (e.g., splitting a phrase, sentence, paragraph, or an entire text document into smaller units, such as individual words or terms), noise removal (e.g., removing whitespaces, characters, digits, and items of text which can interfere with the extraction of features from the data), stopwords removal, stemming, and/or lemmatization.

The data preprocessing may also include placing the data into a tabular format. In the table, the structured columns represent the features (also called "variables") and each row represents an observation or instance (e.g., a particular product offered for sale by the organization during the preceding period). Thus, each column in the table shows a different feature of the instance. Each row in the table can include an identifier that uniquely identifies the instance (e.g., uniquely identifies a product offered for sale by the organization during the preceding period). The data preprocessing may also include placing the data (information) in the table into a format that is suitable for training a model. For example, since machine learning deals with numerical values, textual categorical values (i.e., free text) in the columns can be converted (i.e., encoded) into numerical values. According to one embodiment, the textual categorical values may be encoded using label encoding. According to alternative embodiments, the textual categorical values may be encoded using one-hot encoding.

The preliminary operations may also include null data handling (e.g., the handling of missing values in the table). According to one embodiment, null or missing values in a column (a feature) may be replaced by mean of the other values in that column. For example, mean imputation may be performed using a mean imputation technique such as that provided by Scikit-learn (Sklearn). According to alternative embodiments, observations in the table with null or missing values in a column may be replaced by a mode or median value of the values in that column or removed from the table.

The preliminary operations may also include designating a portion of the dataset (e.g., a portion of the collected corpus of product information) for training the ML model. The remaining portion of the dataset (i.e., the portion of the dataset not designated for training) may be used for evaluating the ML model. For example, in one embodiment, 90% of the dataset can be designated as a training dataset and the remaining 10% of the dataset can be designated as a testing dataset.

The preliminary operations may also include applying feature scaling (also known as "data normalization") to the data to normalize the range of independent variables or features of data. For example, the data in the table (e.g., the collected corpus of product data) may include different types of variables whose range may differ. Using the original scales may apply more weights on the variables with a large range, thus impacting the learning capabilities of the model. To enhance the learning capabilities of the model, in one embodiment, feature scaling through standardization can be applied to rescale the features such that features have the properties of a standard normal distribution with a mean of zero and a standard deviation of one.

The preliminary operations may also include feature selection and/or data engineering to determine or identify the relevant or important features from the noisy data. The relevant/important features are the features that are more correlated with the thing being predicted by the trained model (e.g., a sequence number for a product). A variety of feature engineering techniques, such as exploratory data analysis (EDA) and/or bivariate data analysis with multi-variate-variate plots and/or correlation heatmaps and diagrams, among others, may be used to determine the relevant features. For example, the relevant features may include information from the product attributes information, product selling context information, product variants information, product order information-based geolocation information, product payment transactions information, product review information, product ratings information, and/or other user generated information.

Each instance in the table may represent a training/testing sample (i.e., an instance of a training/testing sample) in the modeling dataset and each column may be a relevant feature of the training/testing sample. As previously described herein, each training/testing sample may correspond to a product offered for sale by the organization during the preceding period. In a training/testing sample, the relevant features are the independent variables and the thing being predicted (a sequence number) is the dependent variable. The dependent variable in a training/testing sample serves as an informative label which is indicative of the sequencing of the product represented by the training/testing sample in a product category tree. The sequence number (i.e., the informative label) of the training/testing sample can be obtained from the collected corpus of product information.

In some embodiments, the individual training/testing samples may be used to generate a feature vector, which is a multi-dimensional vector of elements or components that represent the features (e.g., variables) in a training/testing sample. In such embodiments, the generated feature vectors may be used for training or testing the ML model to predict a sequence number for an input product (e.g., a new product or an existing product being offered for sale by the organization).

Dimensionality reduction phase 506 can include reducing the number of features in the dataset. For example, since the modeling dataset is being generated from the corpus of product information that includes product attributes (e.g., the product attributes information), the number of features (or input variables) in the dataset may be very large. The large number of input features can result in poor performance for machine learning algorithms. To address this issue, in one embodiment, dimensionality reduction techniques, such as factor analysis (FA), can be applied to reduce the dimension of the modeling dataset (e.g., reduce the number of features in the dataset), hence improving the model's accuracy and performance. In one embodiment, FA can be applied to reduce the dimension of the dataset to three (3) features. In other embodiments, FA can be applied to reduce the dimension of the dataset to five (5), six (6), or any suitable number of features. The dimension of the dataset may be configurable by the organization and/or the user. The generated modeling dataset can be stored within a data repository (e.g., data repository 418), where it can subsequently be retrieved and used.

Model building phase 508 can include creating a shell model (e.g., an ANN) and adding a number of individual layers to the shell model. For example, in one embodiment, the shell model may be created using ML tools and libraries such as that provided by TensorFlow or another open-source project. In one illustrative implementation, the shell model may include an input layer, two (2) hidden layers, and an output layer. The input layer may be comprised of three (3) nodes (also known as "neurons") to match the number of input variables (features) in the modeling dataset. The individual hidden layers may be comprised of an arbitrary number of nodes, which may depend on the number of nodes included in the input layer. For example, in one implementation, each hidden layer may be comprised of six (6) nodes. As a classification model, the output layer may be comprised of a single node. Each node in the hidden layers and the node in output layer may be associated with an activation function. For example, according to one embodiment, the activation function for the nodes in the hidden layers may be a rectified linear unit (ReLU) activation function. As the model is to function as a classification model, the activation function for the node in the output layer may be a softmax activation function. The softmax function can be used as the activation function in the output layer of neural network models that predict a multinomial probability distribution. That is, softmax can be used as the activation function for multi-class classification problems where class membership is required on more than two class labels. In other implementations, the model may be generated to function as a regression model.

Model training and testing phase 510 can include training and testing the shell model using the modeling dataset to create the ML model. For example, once the shell model is created, a loss function (e.g., binary cross entropy), an optimizer algorithm (e.g., Adam or a gradient-based optimization technique such as RMSprop), and validation metrics (e.g., "accuracy") can be specified for training, validating, and testing the model. The model can then be trained/fitted by passing the training dataset (e.g., 90% of the modeling dataset) and specifying a number of epochs. An epoch (one pass of the entire training dataset) is completed once all the observations of the training data are passed through the model. The model can be validated once the model completes a specified number of epochs (e.g., 150 epochs). For example, the model can process the training dataset and a loss/error value can be computed and used to assess the performance of the model. The loss value indicates how well the model is trained. Note that a higher loss value means the model is not sufficiently trained. In this case, hyperparameter tuning may be performed. Hyperparameter tuning may include, for example, changing the loss function, changing the optimizer algorithm, and/or changing the model architecture (e.g., the neural network architecture) by adding more hidden layers. Additionally or alternatively, the number of epochs can be also increased to further train the model. In any case, once the loss is reduced to a very small number (ideally close to 0), the model is sufficiently trained for testing. The model can be tested by passing the testing dataset (e.g., 10% of the modeling dataset not used for training the model). For example, a confusion matrix can be used to evaluate the performance (or "accuracy") of the model. Depending on the results, the training and testing can be iterated to improve the accuracy of the model to a desired level. Once the desired accuracy is achieved, the model may be released (or "published") to production for use in predicting a sequence number for a product which needs to be sequenced (e.g., predict a sequence number for a product being offered for sale by the organization). A predicted sequence number for an input product (e.g., a product being sequenced) may be a sequence number of a product included in the training dataset used in training the model. That is, the predicted sequence number may be an informative label (e.g., a sequence number) of a training sample in the training dataset used in training the model.

Figure 6:
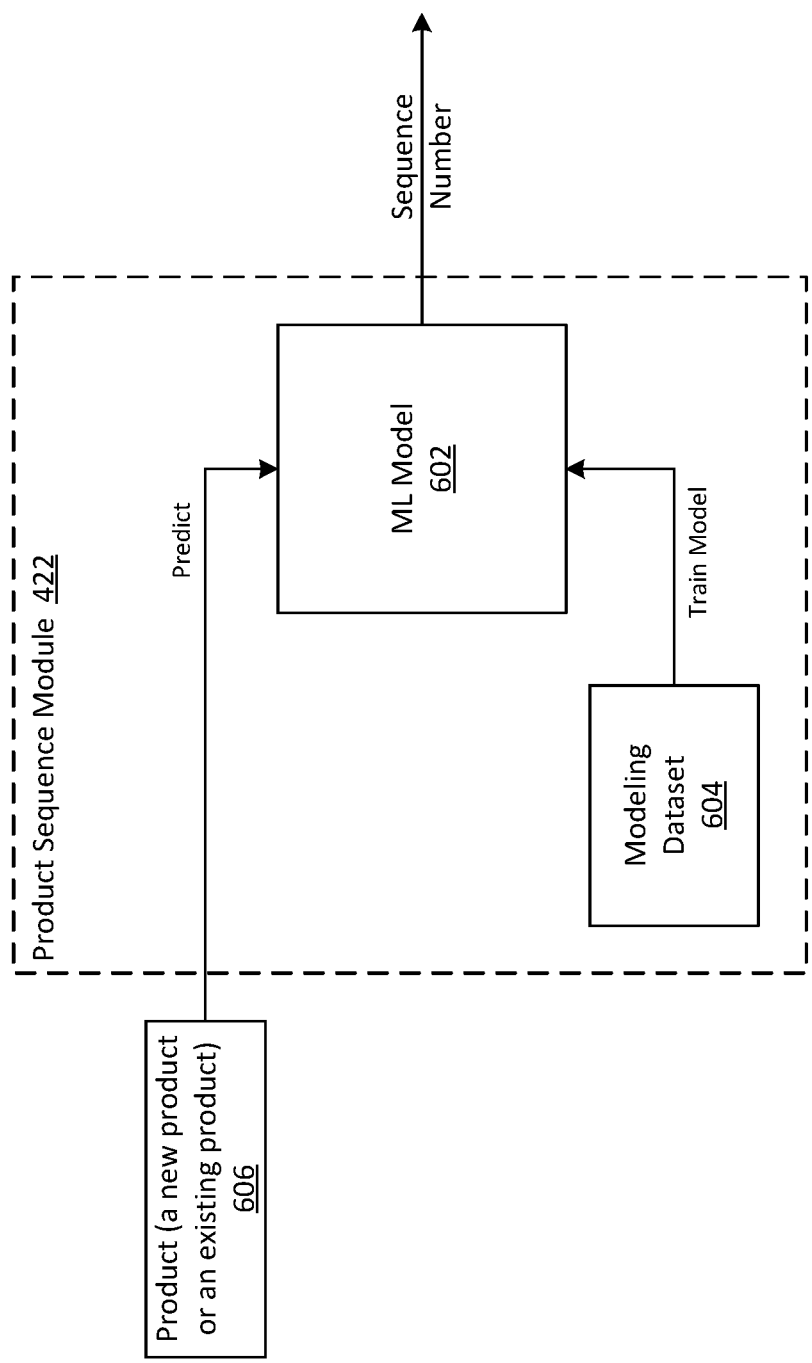
FIG. 6 is a diagram showing an example topology that can be used to predict a sequence for a product, in accordance with an embodiment of the present disclosure.

Referring now to FIG. 6, in which like elements of FIG. 4 are shown using like reference designators, shown is a diagram of an example topology that can be used to predict a sequence for a product, in accordance with an embodiment of the present disclosure. As shown in FIG. 6, product sequence module 422 includes an ML model 602. In some embodiments, ML model 602 may correspond to the ML classification model of FIG. 5. ML model 602 can be trained and tested using machine learning techniques with a modeling dataset 604. Modeling dataset 604 can be retrieved from a data repository (e.g., data repository 420 of FIG. 4). As described previously, modeling dataset 604 for building ML model 602 may be generated from the collected corpus of product information about products offered for sale by the organization during a preceding period (e.g., preceding 6 months). Once ML model 602 is sufficiently trained and tested, product sequence module 422 can, in response to receiving information about a product being offered for sale by the organization (e.g., attributes of the product, product selling context information, product variants information, payment transactions information, order information-based geolocation data, and product reviews and rating data, among others), predict a sequence number for the product. Note that, in case where the product is a new product, the information input to product sequence module 412 may not include payment transactions information, order information-based geolocation data, and/or product reviews and rating data. In some embodiments, product sequence module 422 may preprocess the input information as described herein at least with respect to FIG. 5 to be in a form that is suitable for input to and prediction by ML model 602. In the example of FIG. 6, product sequence module 422 can generate a feature vector 606 that represents the preprocessed information about the product. Feature vector 606 can then be input, passed, or otherwise provided to the trained ML model 602. In some embodiments, the input feature vector 606 (e.g., the feature vector representing the product) may include some or all the relevant features which were used in training ML model 602. In response to the input, the trained ML model 602 can output a prediction of a sequence number for the product.

Figure 7:
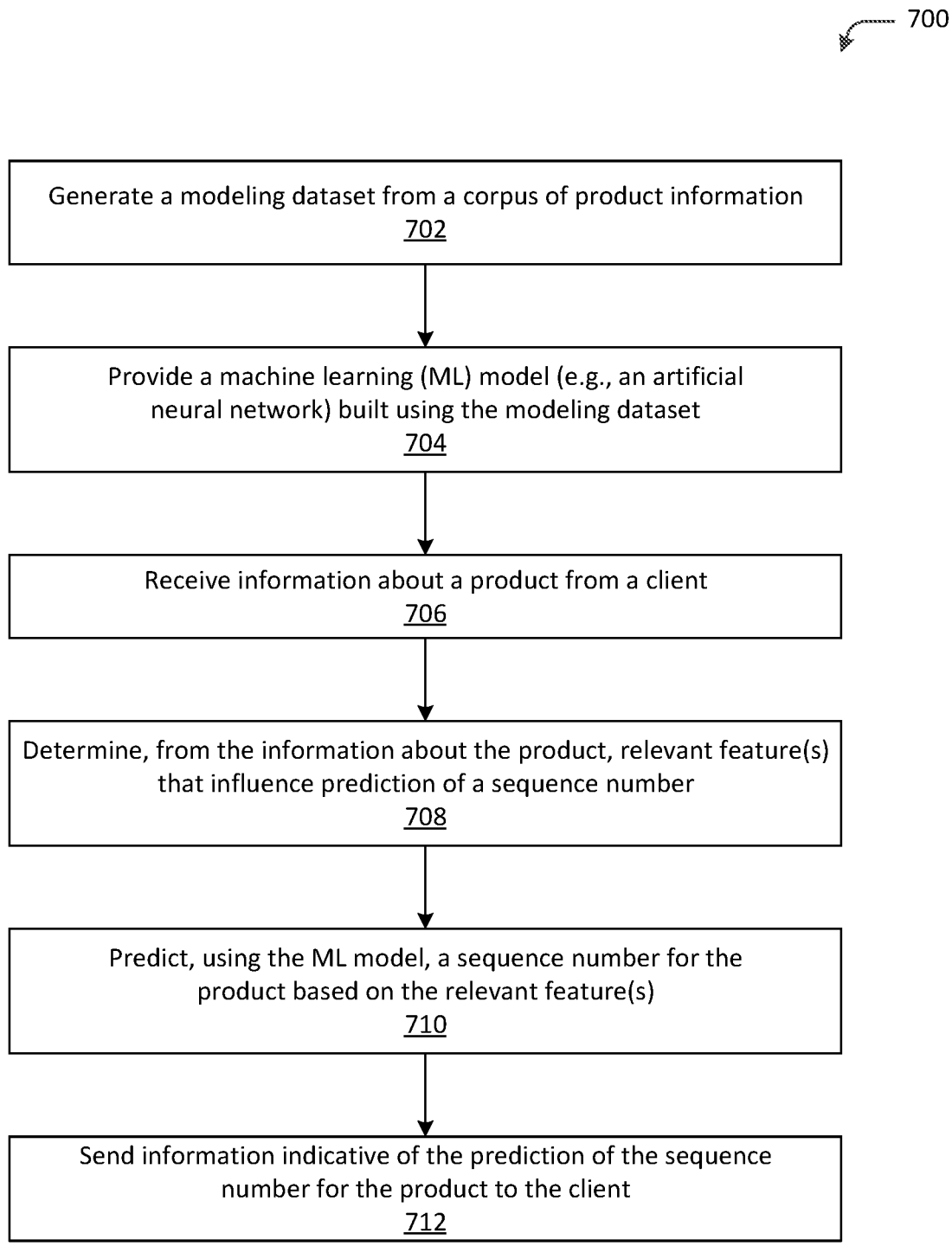
FIG. 7 is a flow diagram of an example process for prediction of a sequence number for a product, in accordance with an embodiment of the present disclosure.

FIG. 7 is a flow diagram of an example process 700 for prediction of a sequence number for a product, in accordance with an embodiment of the present disclosure. Illustrative process 700 may be implemented, for example, within system 400 of FIG. 4. In more detail, process 700 may be performed, for example, in whole or in part by product sequence recommendation application 406, modeling dataset module 420, and product sequence module 422, or any combination of these including other components of system 400 described with respect to FIG. 4.

With reference to process 700 of FIG. 7, at 702, a modeling dataset may be generated from a corpus of product information. The corpus of product information may be about products offered for sale by an organization during a preceding period such as a preceding 6 months. For example, data collection module 416 can collect product information about the organization's products from one or more data sources used by the organization to store or maintain such information/data and store the collected product information within data repository 418. Modeling dataset module 420 can retrieve the corpus of product information from data repository 418, generate the modeling dataset, and store the modeling dataset within data repository 418.

At 704, an ML model built using the generated modeling dataset may be provided. For example, a learning algorithm (e.g., an ANN) may be trained and tested using machine learning techniques with the modeling dataset to build the ML model. For example, in one implementation, product sequence module 422 can retrieve the modeling dataset from data repository 418 and use the modeling dataset to train and test an ANN. Product sequence module 422 can use the trained ML model to predict a sequence number for a product (e.g., a new product to sequence or an existing product to re-sequence).

At 706, information about a product may be received. The product may be a new product that is being offered for sale by the organization and which needs to be sequenced. For example, the information about the new product may be received along with a request to sequence the new product from a client (e.g., client device 402 of FIG. 4). In response to the information about the new product being received, at

708, relevant feature(s) that influence prediction of a sequence number may be determined from the received information about the new product. For example, in one implementation, product sequence module 422 can preprocess the received information (e.g., apply feature scaling, aggregation, factor analysis, etc.) to determine the relevant feature(s) that influence prediction of a sequence number.

At 710, a sequence number for the new product may be predicted based on the relevant feature(s) determined from the information about the new product. For example, product sequence module 422 can generate a feature vector that represents the relevant feature(s) of the new product. Product sequence module 422 can then input the generated feature vector to the trained ML model, which outputs a prediction of a sequence number for the new product.

At 712, information indicative of the prediction of the sequence number for the new product may be sent or otherwise provided to the client and presented to a user (e.g., the user who sent the request to sequence the new product). For example, the information indicative of the prediction may be presented within a user interface of a client application (e.g., product sequence recommendation application 410 of FIG. 4) on the client. The user can then take appropriate action based on the provided prediction (e.g., accept the prediction, reject the prediction, or change the prediction).

In some embodiments, additional operations may be performed. For example, in one embodiment, a new product category tree may be generated which includes the sequencing of the new product based on the predicted sequence number for the new product. The new product category tree can represent the sequencing of the products, including the new product, which are being offered for sale by the organization. In one embodiment, the new product category tree can be generated by inserting (or "including") the new product into an existing product category tree of the organization based on the predicted sequence number for the new product. Inserting the new product into the existing product category tree may cause a change in the sequencing of one or more products and/or subcategories/sub-sub-categories/etc. in the existing product category tree. A visual representation of the new product category tree may then be presented within the user interface of the client application. The user can then take appropriate action based on the provided visual representation of the new product category tree (e.g., use one or more provided UI controls/elements to make changes to the new product category tree).

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   training a machine learning (ML) model on a corpus of product information to generate a first product category tree;
   receiving, by a computing device, information about a product from another computing device;
   determining, by the computing device, one or more relevant features from the information about the product, the one or more relevant features influencing prediction of a sequence number;
   generating, by the computing device using the ML model, a prediction of a sequence number for the product based on the determined one or more relevant features, the sequence number being indicative of a sequencing of the product within a sequence of a plurality of products in the first product category tree; and
   generating, by the computing device by updating the first product category tree, a second product category tree which includes the sequencing of the product within the sequence of the plurality of products based on the predicted sequence number for the product.

2. The method of claim 1, wherein the ML model includes an artificial neural network (ANN).

3. The method of claim 1, wherein the ML model is built using a modeling dataset generated from a corpus of product information about products offered for sale by an organization during a preceding period.

4. The method of claim 3, wherein the product information includes product attributes information.

5. The method of claim 3, wherein the product information includes product selling context information.

6. The method of claim 3, wherein the product information includes product variants context information.

7. The method of claim 3, wherein the product information includes product order information-based geolocation information.

8. The method of claim 3, wherein the product information includes product payment transactions information.

9. The method of claim 3, wherein the product information includes product review information.

10. The method of claim 3, wherein the product information includes product ratings information.

11. The method of claim 1, wherein the product is a new product.

12. The method of claim 1, wherein the product is an existing product.

13. A computing device comprising:
    one or more non-transitory machine-readable mediums configured to store instructions; and
    one or more processors configured to execute the instructions stored on the one or more non-transitory machine-readable mediums, wherein execution of the instructions causes the one or more processors to carry out a process comprising:
    training a machine learning (ML) model on a corpus of product information to generate a first product category tree;
    receiving information about a product from another computing device;
    determining one or more relevant features from the information about the product, the one or more relevant features influencing prediction of a sequence number;
    generating, using the ML model, a prediction of a sequence number for the product based on the determined one or more relevant features, the sequence number being indicative of a sequencing of the product within a sequence of a plurality of products in the first product category tree; and
    generating, by updating the first product category tree, a second product category tree which includes the sequencing of the product within the sequence of the plurality of products based on the predicted sequence number for the product.

14. The computing device of claim 13, wherein the ML model includes an artificial neural network (ANN).

15. The computing device of claim 13, wherein the ML model is built using a modeling dataset generated from a corpus of product information about products offered for sale by an organization during a preceding period.

16. The computing device of claim 15, wherein the preceding period is a preceding six months.

17. The computing device of claim 14, wherein the product information includes one or more of product attributes information, product selling context information, product variants context information, product order information-based geolocation information, product payment transactions information, product review information, or product ratings information.

18. A non-transitory machine-readable medium encoding instructions that when executed by one or more processors cause a process to be carried out, the process including:
    training a machine learning (ML) model on a corpus of product information to generate a first product category tree;
    receiving information about a product from a computing device;
    determining one or more relevant features from the information about the product, the one or more relevant features influencing prediction of a sequence number;
    generating, using the ML model, a prediction of a sequence number for the product based on the determined one or more relevant features, the sequence number being indicative of a sequencing of the product within a sequence of a plurality of products in the first product category tree; and
    generating, by updating the first product category tree, a second product category tree which includes the sequencing of the product within the sequence of the plurality of products based on the predicted sequence number for the product.

19. The machine-readable medium of claim 18, wherein the ML model is built using a modeling dataset generated from a corpus of product information about products offered for sale by an organization during a preceding period.

20. The machine-readable medium of claim 19, wherein the product information includes one or more of product attributes information, product selling context information, product variants context information, product order information-based geolocation information, product payment transactions information, product review information, or product ratings information.

* * * * *